May 24, 1960 J. M. McMICHAEL, JR 2,937,692
RANGE FINDER OPERATOR'S SEAT
Filed April 24, 1958 3 Sheets-Sheet 1
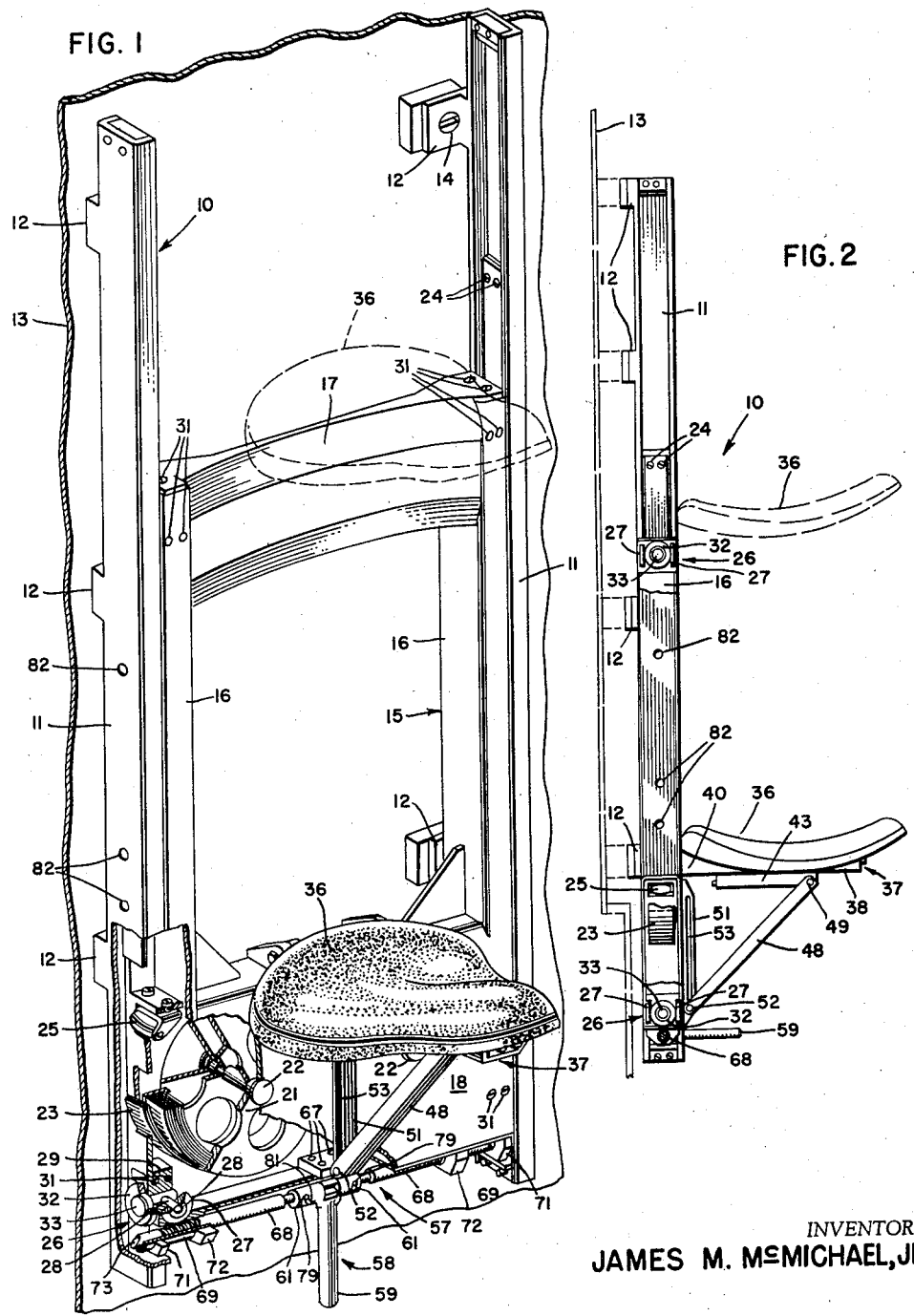
INVENTOR
JAMES M. McMICHAEL, JR.
BY
ATTORNEYS May 24, 1960

J. M. McMICHAEL, JR 2,937,692

RANGE FINDER OPERATOR'S SEAT

Filed April 24, 1958

INVENTOR
JAMES M. McMICHAEL, JR.

BY

*G. D. O'Brien*
*G. Baxter Warner*
ATTORNEYS

May 24, 1960  J. M. McMICHAEL, JR  2,937,692
RANGE FINDER OPERATOR'S SEAT
Filed April 24, 1958  3 Sheets-Sheet 3
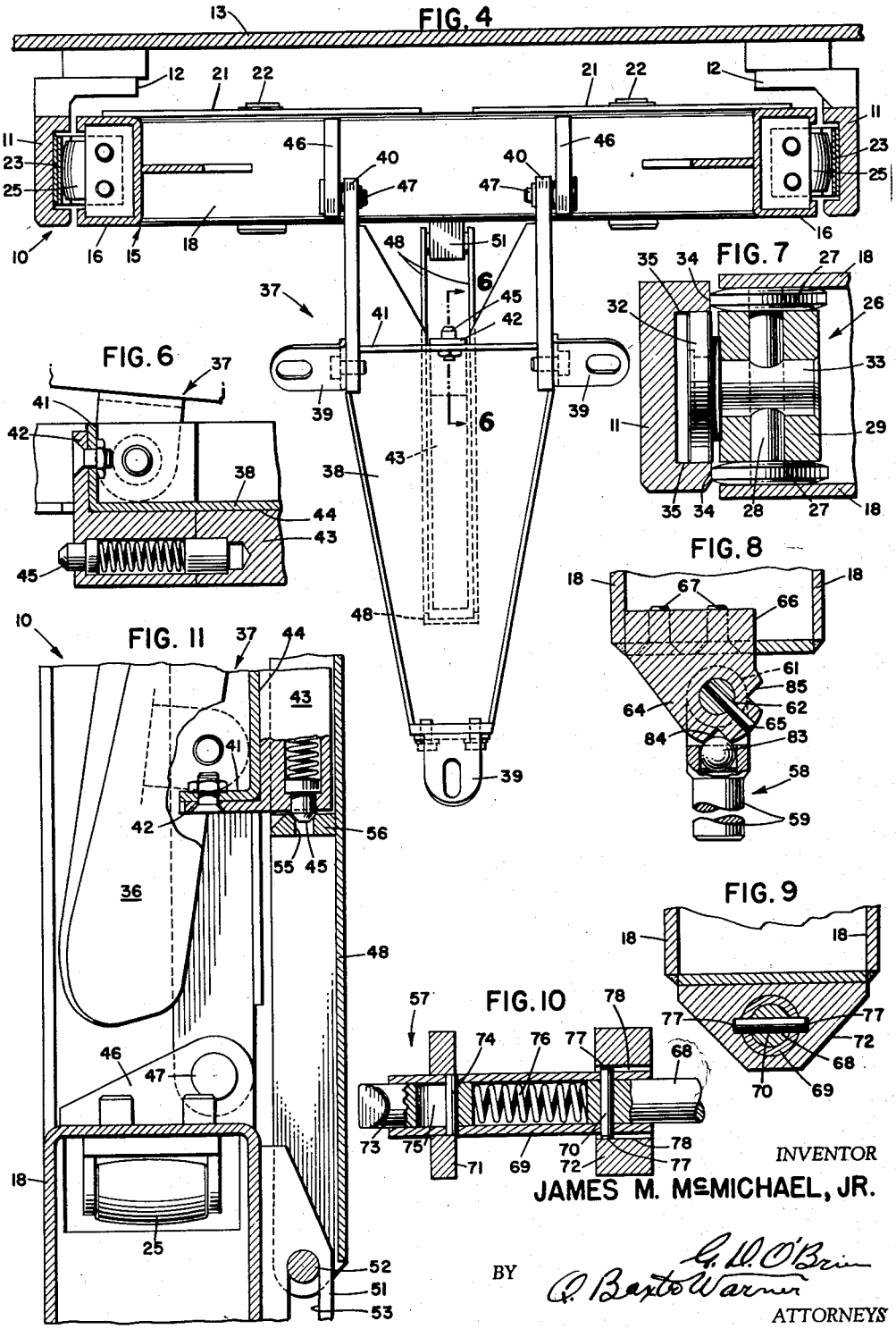
INVENTOR
JAMES M. McMICHAEL, JR.
BY
ATTORNEYS

United States Patent Office 2,937,692
Patented May 24, 1960

2,937,692
RANGE FINDER OPERATOR'S SEAT

James M. McMichael, Jr., Cheverly, Md., assignor to the United States of America as represented by the Secretary of the Navy Filed Apr. 24, 1958, Ser. No. 730,731

5 Claims. (Cl. 155—88)

(Granted under Title 35, U.S. Code (1952), sec. 266)

The invention described herein may be manufactured and used by or for the Government of the United States of America for governmental purposes without the payment of any royalties thereon or therefor.

The present invention relates to an adjustable seat and more particularly to a range finder operator's seat.

The invention contemplates the provision of a new and improved adjustable seat which enables the operator of a range finder to raise and lower the seat with a minimum amount of effort whereupon the operator may readily follow the eyepiece of the range finder during elevation and depression operations of the range finder. Moreover, the invention provides a new and improved adjustable seat utilizing a constant load type spring arrangement which supplies a uniform support for the operator throughout all positions of operation. The spring arrangement is adapted to induce an upward thrust to offset in part the physical effort required by the operator during a seat adjustment operation and in which new and improved locking means are provided for locking the seat in various positions, such for example, as upper, lower and intermediate positions.

An object of the present invention is to provide a new and improved adjustable seat suitable for use by the operator of a range finder.

Another object of the invention is the provision of an adjustable seat in which rotatable actuated locking means lock the seat in an adjusted position.

Another object of the invention is the provision of an adjustable seat in which constant load type devices provide a uniform support for an operator throughout all positions of operation.

A further object of the invention is the provision of an adjustable seat in which constant load type devices urge the seat in one direction and in which means are provided to lock the seat in a predetermined position to prevent movement thereof in a reverse direction when the seat is in use.

A still further object of the invention resides in the provision of an adjustable chair for use by a range finder operator to permit the operator to remain comfortably seated while operating the range finder throughout its complete range of movement.

Other objects and many of the attendant advantages of this invention will be readily appreciated as the same becomes better understood by reference to the following detailed description when considered in connection with the accompanying drawings wherein:

Fig. 1 is a perspective view of the adjustable seat partially in elevation and partially in section and constructed in accordance with the present invention;

Fig. 2 is a side elevational view of the device of Fig. 1 illustrating the seat in an initial position in full lines and in an adjusted position in phantom outline;

Fig. 4 is a sectional view taken substantially on line 4—4 of Fig. 3 with the seat removed;

Fig. 6 is an enlarged fragmentary sectional view taken substantially on line 6—6 of Fig. 4;

Fig. 7 is a sectional view taken on a line substantially corresponding to line 7—7 of Fig. 3;

Fig. 8 is an enlarged fragmentary sectional view as viewed from a line substantially corresponding to line 8—8 of Fig. 3;

Fig. 9 is an enlarged sectional view taken on a line substantially corresponding to line 9—9 of Fig. 3;

Fig. 10 is an enlarged fragmentary sectional view of the locking device for locking the seat in an adjusted position; and Fig. 11 is an enlarged fragmentary sectional view of the seat in a folded condition.

Figure 3:
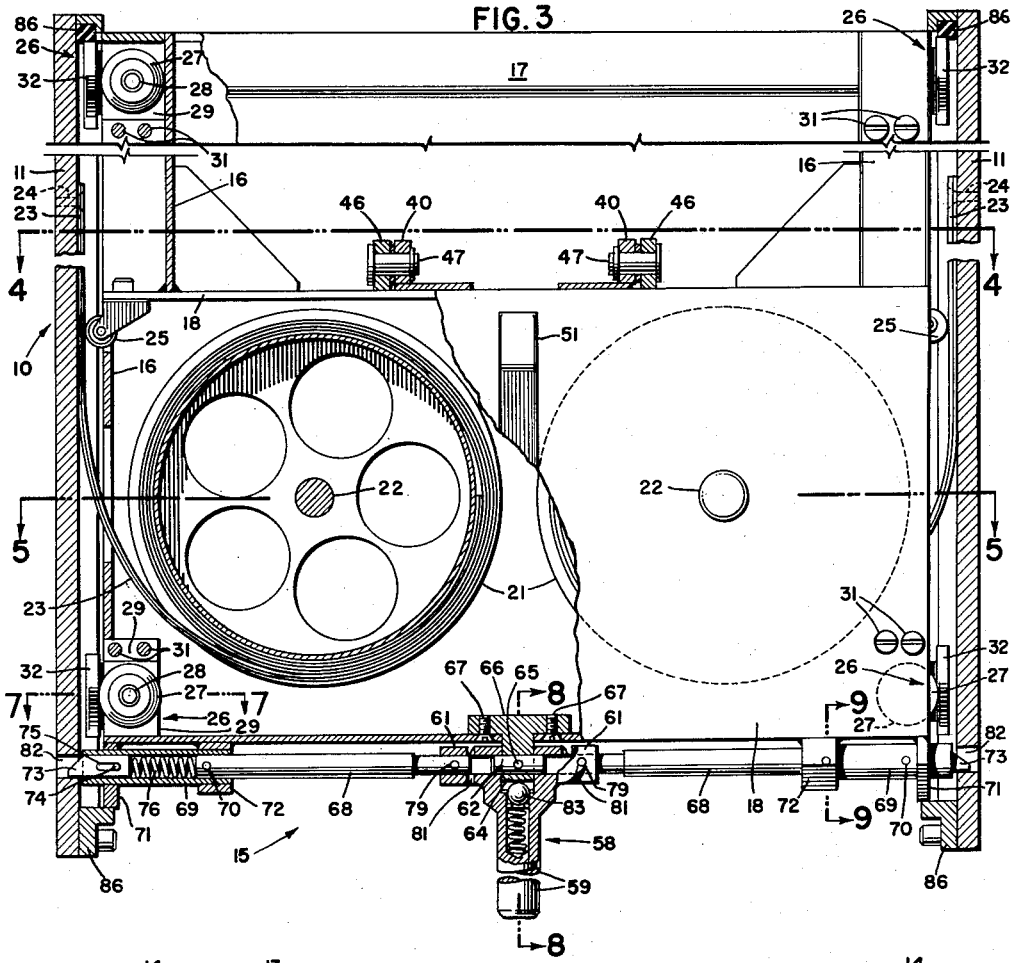
Fig. 3 is an enlarged fragmentary front view of the device, partially in elevation and partially in section with the seat frame and tracks broken away.

Referring now to the drawings and more particularly to Fig. 1, the numeral 10 generally indicates the adjustable seat comprising a pair of mutually spaced channel members or tracks 11. The tracks 11 are each provided with a plurality of lugs 12 arranged in spaced relation with respect to each other and secured to the wall 13 of a conventional shield by screws or the like 14 whereupon the tracks are maintained in predetermined spaced relationship.

A seat frame generally indicated by the reference character 15 disposed between and movable along the tracks 11, the frame comprises a pair of mutually spaced channel members 16 having a back rest 17 carried at one end and a casing 18 carried at the other end thereof, the back rest and casing being secured to each member 16 by any suitable means such, for example, as by welding.

Figure 5:
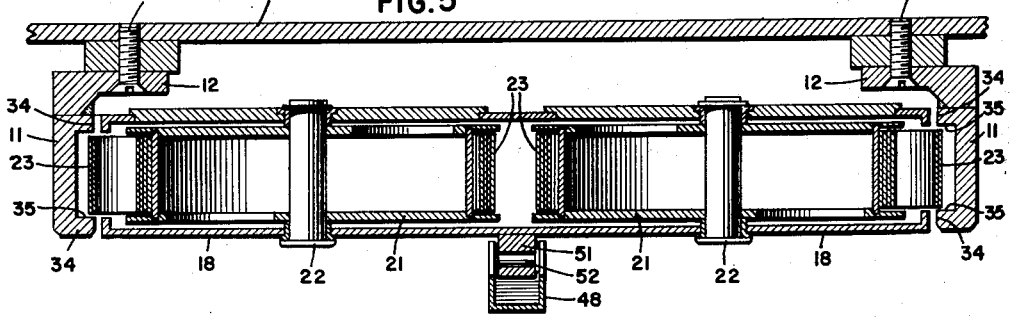
Fig. 5 is a sectional view as viewed from a line substantially corresponding to line 5—5 of Fig. 3.

As more clearly shown on Figs. 3 and 5, a pair of drums 21 are arranged within casing 18. Each drum 21 carries a shaft 22 which is rotatably supported on casing 18 to permit free rotation of the drums. A noncumulative force spring 23 is disposed about each drum with one end wrapped therearound and the other or free end thereof being secured to one of each of the channel members 11 by bolts or the like 24, Figs. 1 and 3. The aforesaid springs 23 are of the type known in the art as a constant load type spring which are normally wound and which when unwound possess the peculiar characteristics of assuming its normal wound condition. Moreover, unlike the ordinary clock spring type, which consists of a spring within a drum and a cable or ribbon wrapped around the drum, this device uses a ribbon spring, the normal position of which is a tightly wound coil wrapped around the drums. Figs. 1 and 2 illustrate the seat in its lowermost locked position and the springs have been unwound, since the free ends are secured to the channels 11 and the spools or drums 21 are allowed to turn on their axes or shafts in the casing 18. The springs will invariably tend to assume their normal coiled condition around the drums and thus the seat will be moved in an upwardly direction along the channels 11 until pressure is applied thereto. The springs are guided and maintained within the channels 11 by rollers 25 secured to the casing 18 at opposite sides thereof and in engagement with their respective spring, Figs. 3 and 4.

The aforesaid seat frame 15 is provided with roller devices generally indicated by the numeral 26, one roller device being secured within each of the channel members 16 at one end thereof and within casing 18 in each lowermost corner thereof, as best shown in Fig. 7. The roller devices 26 are provided with a pair of rollers 27 in spaced relationship and rotatably supported on a shaft 28 carried by block 29 secured to their respective components, as at 31, Fig. 3. The devices are provided with an additional roller 32 disposed normally with respect to the rollers 27 and rotatably supported on a shaft 33. By the aforesaid roller arrangement, as is more clearly shown on Fig. 7, the seat frame is maintained between the channels 11 and is freely movable along the channels, it being noted that rollers 27 ride on channel members 11, as at 34 and roller 32 rides on channel members, as at 35.

A conventional bicycle-type seat 36 is pivotally mounted on the casing 18 by a support generally indicated by the reference character 37, the support comprising a plate 38 having a plurality of lugs 39 carried thereby for attaching the seat to the plate, as by screws or the like, Fig. 4. The plate 38 is further provided with a pair of mutually spaced arms 40 connected by a brace or bridge member 41 having a centrally disposed tab or lug 42 secured thereto and extending therefrom for supporting one end of a detent casing 43, the casing or housing also being secured to plate 38, as at 44 in any suitable manner. A spring urged detent 45 is arranged in one end of the housing, the purpose of which will become apparent as the description proceeds. Each arm 40 is pivotally mounted on a bracket 46, as at 47, the bracket being carried by and secured to the casing 18 in any conventional manner. The seat 36 is provided with a brace 48. One end of the brace is pivotally connected to the casing 43 by a pin 49, Fig. 2, the other end thereof being connected to a guide member 51 mounted on casing 18 by pin 52 carried by brace 48 and disposed within an elongated slot 53 formed in guide member 51. It will be understood that when the seat is in a vertical stowed position as shown in Fig. 11 the spring urged detent 45 in housing 44 engages an aperture 55 provided in a bar 56 carried by the brace 48.

A locking mechanism generally indicated by the reference character 57, Figs. 1 and 3, is provided for locking seat frame 15 in an initial, adjusted or stowed position. The locking mechanism comprises a bifurcated actuating member 58 provided with a handgrip 59 terminating in a pair of mutually spaced sleeves 61, Figs. 1 and 3. The sleeves 61, an integral part of actuating member 58, are rotatably supported on shaft 62, the shaft being secured to lug 64 by a pin 65, the lug being carried by a bracket 66 secured to the lower wall of casing 18, as at 67, Figs. 3 and 8. Each sleeve 61 supports one end of a rod 68, the other end of the rod having a tubular member 69 attached thereto, as by a pin 70, member 69 being slidably mounted in bearings 71 and 72. A detent 73 is slidably disposed within outermost end of the sleeve or tubular member 69 and maintained therein by a pin 74 carried by the sleeve and extending through a slot 75 formed in detent 73, the detent being urged to a locking position by a spring 76 disposed between the detent and rod 68, Figs. 3 and 10. It will be noted from a consideration of Figs. 9 and 10 that the pin 70 is carried by rod 68 with the terminal ends 77 thereof extending through sleeve 69 and disposed in complementary slots 78 formed in bearing 72. As shown on Fig. 3, each rod 68 is provided with a pin 79 disposed in a helical slot 81 formed in each of the aforesaid sleeves 61. By this arrangement and upon rotation of the actuating member 58 the detents 73 may be moved slidably into and out of engagement with a plurality of locking openings 82 formed in each of the rails or tracks 11. It will be understood, however, that upon rotation of the actuating device 58 rotation of the rods 68 and sleeve 69 is prevented by reason of the pin and slot connection between the rods, sleeves and bearings 72 and rotation of the detents 73 is prevented by reason of the pin and slot connection between the detents and sleeves.

As shown on Fig. 8, the actuating device 58 is provided with a spring urged locking ball or detent 83 disposed within the member 59 in engagement with a groove 84 in lug 64 for locking the actuating device in a position to maintain the detents 73 of the locking devices 57 in locking engagement with the openings 82 in each track 11. The lug 64 is further provided with a groove or recess 85 adapted to be engaged by the aforesaid locking ball for maintaining the detents 73 of the locking devices in a release position with respect to the openings 82 in the tracks 11. The tracks 11 are each provided with suitable stop 86 at opposite ends thereof to maintain the seat frame 15 within the tracks 11 when the seat frame is in an initial position and when the seat frame and seat have been moved to a stowed position.

It will be understood that when the detents 73 are in the aforesaid locking condition, the seat is locked to the tracks 11 and movement of the seat in a downwardly direction is prevented whereupon it will support the entire weight of the operator. When in this position, however, and in the event that the operator desires the seat to move in an upwardly direction from one position to another he must decrease his pressure on the seat and thus by reason of the specific characteristics of the spring 23 to assume their initial wound condition about the drums 21, the seat and frame are urged upwardly with sufficient force to cause actuation of the detents to release position since the aforesaid detents are constructed and arranged to yield under an upwardly directed force applied thereto. It will be further understood that by the aforesaid locking structure the seat frame including the seat may be locked in various positions to the pair of guide and supporting tracks or rails such, for example, as upper and lower positions, as shown on Figs. 1 and 2, or in an intermediate position if so desired.

Briefly stated in summary, the invention provides a range finder operator's seat wherein constant load-type springs are utilized to provide a uniform support for the operator throughout the several positions of operation and which enables the operator to raise and lower himself with a minimum amount of effort. The invention further provides an adjustable seat arrangement whereupon the operator of a range finder may remain seated while following the rotation of the conventional eyepiece of the range finder and in which locking means are employed to lock the seat in several rest positions.

Obviously many modifications and variations of the present invention are possible in the light of the above teachings. It is therefore to be understood that within the scope of the appended claims the invention may be practiced otherwise than as specifically described.

What is claimed is:

1. A device of the character described comprising mutually spaced guide tracks, movable means disposed between and guided by said tracks, normally wound spring means rotatably supported on said movable means and having the free ends thereof secured to said tracks for moving said movable means in one direction along the tracks to a selected position, means carried by said movable means for supporting said spring means for free rotation, rod means slidably mounted on said movable means, means including an actuating member pivotally mounted on said movable means for supporting said rod means for said sliding movement, means carried by said movable means for pivotally mounting said actuating member thereto, means including an actuating pin carried by said rod means in engagement with complementary means on said actuating member for imparting said sliding movement to said rod means as said actuating member is rotated a predetermined amount about its pivot, spring urged locking means connected to and movable by and in response to said movement of the rod means for locking said movable means to said tracks in a selected position, a seat pivotally and adjustably mounted on said movable means and movable thereby as the movable means is moved along said tracks by said spring means from an initial position to a folded locked position when the movable means is in a state of rest, a support carried by said movable means and pivotally connected to said seat and slidably mounted on said movable means for supporting the seat upon said movable means in said initial position as the movable means is moved along said tracks by said spring means, and a spring urged detent carried by said seat and movable into engagement with complementary means on said support for maintaining the seat in said folded locked position on said movable means when said movable means is in a state of rest.

2. A device according to claim 1, wherein said actuating member is provided with slot means in the form of a helix in which said actuating pin rides as the actuating member is rotated about its pivot.

3. A device according to claim 1, wherein said actuating member includes a spring actuated locking element movable into engagement with complementary groove means on said mounting means for locking the actuating member in a selected position.

4. A device of the character described comprising a pair of mutually spaced guide tracks, a movable casing disposed between and guided by said tracks and supporting an adjustable seat for movement therewith, constant load type spring means rotatably supported within said casing and having the free ends thereof secured to one of each of said tracks for moving said casing and seat in an upwardly direction along the tracks to a selected position, rod means slidably mounted on said casing, an actuating member rotatably mounted on the casing for actuating said rod means as said actuating member is rotated a predetermined amount, pin means carried by said rod means, complementary means on said actuating member in engagement with said pin means for imparting sliding movement to the rod means as said actuating member is rotated said predetermined amount, and means controlled by and responsive to said sliding movement of said rod means for locking said casing to said tracks thereby to maintain said seat in a selected position.

5. A device of the character described comprising a pair of mutually spaced guide tracks, a movable casing disposed between and guided by said tracks and supporting an adjustable seat for movement therewith, constant load type spring means rotatably supported within said casing and having the free ends thereof secured to one of each of said tracks for moving said casing and seat in an upwardly direction along the tracks to a selected position, means slidably mounted on said casing, means rotatably mounted on the casing for actuating said slidable means as said actuating means is rotated a predetermined amount, means for rotatably mounting said actuating means on the casing, means for rotating said actuating means said predetermined amount, pin means carried by said slidable means, complementary means on said actuating means in engagement with said pin means for imparting sliding movement to said slidable means as the actuating means is rotated said predetermined amount, means controlled by and responsive to said sliding movement of said slidable means for locking said casing to said tracks as the casing is moved to a selected position by said constant load type spring means, spring actuated locking means carried by said actuating means, and complementary means on said mounting means and cooperating with said spring actuated locking means for locking the actuating means is a selected position.

References Cited in the file of this patent

UNITED STATES PATENTS

| | | |
|---|---|---|
| 1,861,938 | Roche | June 7, 1932 |
| 2,383,173 | Watter | Aug. 21, 1945 |
| 2,413,168 | Caffrey | Dec. 24, 1946 |
| 2,609,193 | Foster | Sept. 2, 1952 |
| 2,664,144 | Johnson | Dec. 29, 1953 |
| 2,715,433 | Dolgorukov | Aug. 16, 1955 |